Patented Sept. 19, 1950

2,523,146

UNITED STATES PATENT OFFICE 2,523,146

PROCESS OF PREPARING DISULFIDE DERIVATIVES OF THIOPHOSPHORIC AND THIOPHOSPHOROUS ACID ESTERS

Harry W. Rudel, Roselle Park, and James M. Boyle, Bayonne, N. J., assignors to Standard Oil Development Company, a corporation of Delaware No Drawing. Application December 31, 1947, Serial No. 795,148

8 Claims. (Cl. 260—461.1)

This invention relates to a method of producing disulfide derivatives of organo-substituted thiophosphorous and thiophosphoric acids.

It is known that the organo-substituted thiophosphorous and thiophosphoric acids may be converted into corresponding disulfide compounds by oxidation processes in which the hydrogen atoms of the sulfhydryl groups are removed, permitting the sulfur atoms of two molecules of the acids to join. Chlorine has been proposed as an oxidizing agent for this purpose, but it has been found in practice that the chlorine also tends to chlorinate the organic portion of the acid molecule, and where this result is not desired chlorine is an unsuitable agent for the purpose. Bromine produces similar results. Iodine is less objectionable in this respect but its use is not economically feasible for commercial purposes. Oxidizing agents containing metals, e. g., ferric chloride, cupric sulphate, permanganates, chromates, and the like will react with the acid to form metal organo-thiophosphates. Hypochlorites are not effective.

In accordance with the present invention, the oxidizing process may be satisfactorily carried out by converting the organo-thiophosphorous and organo-thiophosphoric acid into a water-soluble salt, dissolving this salt and a water-soluble metal nitrite in water, and adding a mineral acid to liberate the nitrous acid in solution. The reaction is exothermic and means for controlling the temperature are generally required. The acid not only liberates the nitrous acid but converts the salt into the free acid of phosphorus, and the disulfide reaction product is precipitated, generally as an oil, from the aqueous medium.

The process of the present invention may be applied to the conversion of any acid of the formula

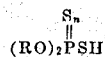

where R is any hydrocarbon radical, e. g., an alkyl, alkenyl, cycloalkyl, aryl, alkaryl, or aralkyl group, and $n$ is 0 or 1, into the corresponding disulfide derivative of the formula

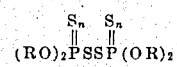

where R and $n$ have the same meaning as above.

The organo-substituted thiophosphorous and thiophosphoric acids may be prepared by known means, for example, by reacting an alcohol or phenol with a sulfide of phosphorus. Examples of the acids of phosphorus which may readily be converted into the disulfide products in accordance with the present invention include diethyldithiophosphoric acid, di-isopropyldithiophosphoric acid, di-sec.-butyldithiophosphoric acid, di-sec.-butylthiophosphorous acid, di-octyldithiophosphoric acid, di-stearyldithiophosphoric acid, di-oleyldithiophosphoric acid, di-(tert.-octyl phenyl) dithiophosphoric acid, di-(tert.-octyl phenyl) thiophosphorous acid, di-benzyldithiophosphoric acid, and the like. The invention has particular application in the conversion of acids in which the organic group is an alkyl group containing 2 to 8 carbon atoms per molecule.

In accordance with the process of this invention, the acid of phosphorus must first be converted into a water-soluble metal salt, and since only the alkali metal salts are sufficiently soluble, only these metal salts are suitable. The metal salt may be prepared in aqueous solution using a caustic alkali solution for the neutralization of the acid and this solution employed for the oxidizing reaction. The metal nitrite which is to be added to the aqueous solution should be an alkali metal nitrite which is completely soluble in the solution. The amount of metal nitrite to be added should be at least equal in molecular proportions to the salt of the acid of phosphorus. A mineral acid, e. g., sulfuric acid, phosphoric acid, or hydrochloric acid, is then added to liberate free nitrous acid for the oxidizing reaction and the acid is added gradually because of the heat evolved, and artificial cooling is normally required. The reaction may be conducted at any temperature between the freezing point and the boiling point of the reaction mixture. For maximum yields, sufficient amount of acid is required to liberate an amount of nitrous acid which is a molecular equivalent of the salt of the acid of phosphorus and it must in addition be sufficient to convert the salt of the acid of phosphorus into the free acid. The product normally separates from the aqueous medium as formed, and it may be purified by washing with an alkaline solution such as a sodium carbonate solution and then with water, and finally drying.

The following examples, in which several embodiments of the present invention are described in detail, are given for illustrative purposes, but are not to be considered as limiting the scope of the invention in any manner.

EXAMPLE 1.—PREPARATION OF DISULFIDE FROM SECONDARY BUTYL DITHIOPHOSPHORIC ACID 1776 g. (8 mols) of phosphorus pentasulfide was added to 2376 g. (32 mols) of secondary butyl alcohol at room temperature to a round bottom flask fitted with a reflux condenser and a mechanical stirrer. The reaction was exothermic and was controlled by external cooling at a temperature of approximately 40° C. The reaction mixture was maintained at 40° C. for three hours and the temperature then increased to 90° C. for an additional two hours. The secondary butyl dithiophosphoric acid thus formed was filtered through 50 g. of Hy-flo (a filter aid) to remove a very small amount of unreacted $P_2S_5$. The neutralization number of the product was 207 mg. KOH/g. (Theoretical neut. No.=232 mg.)

640 g. (16 mols) of sodium hydroxide was dissolved in 4000 cc. of water and added through a dropping funnel, with stirring, to the above acid at room temperature. The neutralization reaction was exothermic and the temperature rose to about 50° C. The aqueous sodium salt solution thus formed was filtered through 100 g. of Hy-flo.

1159 g. (16.8 mols) of sodium nitrite was dissolved in the above aqueous solution and 1711 g. of 96% sulfuric acid diluted with 800 cc. of water was added dropwise with stirring, maintaining the reaction temperature at 50–60° C. The addition of the acid required four hours. The reaction mixture was stirred an additional hour and then allowed to settle into two phases. The water layer was drawn off the bottom and the product washed successively with 2000 cc. of water, 2000 cc. of 5% sodium carbonate, and three times with 2000 cc. of water. The wet product was dried by blowing with nitrogen at 110° C. for 30 minutes and then filtered through 100 g. of Hy-flo. 3210 g. of product (83.2% yield), which was a viscous, amber colored oil, was obtained having a neutralization number of 5.0 mg. KOH/g.

*Analysis of product*

|  | Found | Calculated |
|---|---|---|
| Sulfur | 25.9 | 26.6 |
| Phosphorus | 13.1 | 12.9 |

EXAMPLE 2.—PREPARATION OF DISULFIDE FROM DI-ETHYL DITHIOPHOSPHORIC ACID 1332 g. (6 mols) of phosphorus pentasulfide was added to 1104 g. (24 mols) of absolute ethyl alcohol gradually with stirring and external cooling, following the procedure of Example 1. After the addition of the pentasulfide the reaction mixture was maintained at approximately 30° C. for three hours. It was then heated to 90° C. for an additional hour and then filtered through 50 g. of Hy-flo. The neutralization number of product was 226 mg. KOH/g. (Theoretical neut. No.=301.)

480 g. (12 mols) of sodium hydroxide dissolved in 2000 cc. of water was added through a dropping funnel, with stirring, to the above acid at room temperature. During the neutralization the mixture reached a temperature of 48° C. A small amount of insoluble oil was separated from the aqueous solution at this point.

869 g. (12.6 mols) of sodium nitrite was dissolved in the above aqueous solution and 1284 g. of 96% $H_2SO_4$ diluted with 600 cc. of water was added dropwise with stirring, maintaining the reaction temperature at 40–50° C.

The product layer was separated and washed successively with 1500 cc. water, 1500 cc. of 5% NaOH, and three times with 1500 cc. portions of water. The product was then dried by blowing with nitrogen at 110° C. for 50 minutes and then filtered through 20 g. of Hy-flo. 1297 g. of product (58.1% yield), which was a viscous, amber colored oil, was obtained. Neutralization number: 17 mg. KOH/g.

*Analysis of product*

|  | Found | Calculated |
|---|---|---|
| Sulfur | 34.8 | 34.6 |
| Phosphorus | 16.5 | 16.8 |

EXAMPLE 3.—PREPARATION OF DISULFIDE FROM NORMAL PROPYL DITHIOPHOSPHORIC ACID 222 g. (1.0 mol) $P_2S_5$ was added to 240 g. (4.0 mols) normal propyl alcohol with stirring, using the apparatus and general method of procedure of Example 1. The reaction was exothermic and the temperature rose to 60° C. After the evolution of heat had subsided the mixture was heated to 90° C. and held at this temperature for 30 minutes. The free acid thus formed was filtered through 20 g. Hy-flo.

A solution of 80 g. (2 mols) of sodium hydroxide in 500 cc. of water was added slowly to the above acid maintaining the temperature at about 30° C. by means of an ice bath. The aqueous solution of the sodium salt thus obtained was filtered through 30 g. Hy-flo.

138 g. (2 mols) of sodium nitrite was added to the above aqueous solution and a solution of 204 g. of 96% sulfuric acid in 200 cc. of water was added dropwise with stirring, over a period of 2 hours, while maintaining the reaction temperature between 30 and 40° C. by external cooling.

The oily layer was separated and washed successively with 500 cc. of water, 500 cc. of 5% $Na_2CO_3$ and three 500 cc. portions of water. The product was dried by blowing with nitrogen for 15 minutes at 105° C. and then filtered through Hy-flo. 326 g. of a clear, light amber product was thus obtained in a yield of 77%. The neutralization number was 2.0 mg. KOH/g.

*Analysis of product*

|  | Found | Calculated |
|---|---|---|
| Sulfur | 29.4 | 14.3 |
| Phosphorus | 30.0 | 14.6 |

This invention is not to be considered as limited by any of the foregoing examples, which are included for illustrative purposes only, but is to be limited solely by the terms of the appended claims.

We claim:
1. The method of converting an acid selected from the class consisting of acids of the formula—

$$(RO)_2PSH$$

and acids of the formula—

$$(RO)_2\overset{S}{\overset{\|}{P}}SH$$

where R is any hydrocarbon radical, into the corresponding disulfide derivative of the class consisting of compounds of the formula—

$$(RO)_2PSSP(OR)_2$$

and compounds of the formula—

$$(RO)_2\overset{S}{\overset{\|}{P}}SS\overset{S}{\overset{\|}{P}}(OR)_2$$

where R has the meaning given above, which comprises converting said acid into a water-soluble metal salt, dissolving said salt in water, adding to the solution thus formed at least a molecular equivalent of a nitrous acid radical in the form of an alkali metal nitrite, and further adding to the said solution a mineral acid in an amount which corresponds to at least the hydrogen equivalent of the metal of the salt of the acid of phosphorus and of the metal of a molecular equivalent thereof of the said metal nitrite.

2. A method according to claim 1 in which R of the formulas is an alkyl group and in which the salt of the said acid and the metal nitrite are sodium salts.

3. A method according to claim 1 in which the mineral acid is sulfuric acid.

4. The method which comprises adding a mineral acid to an aqueous solution containing an alkali metal salt of a dialkyldithiophosphoric acid and an alkali metal nitrite in substantially equal molecular proportions.

5. The method of converting a dialkyldithiophosphoric acid, where the alkyl group contains from 2 to 8 carbon atoms each, into the corresponding disulfide which comprises converting said acid into a sodium salt, dissolving one molecular proportion of such salt in water, adding one molecular proportion of sodium nitrite to the solution thus formed, and gradually adding one molecular proportion of sulfuric acid to said solution while maintaining the solution at a temperature between the freezing point and the boiling point thereof.

6. The method of converting di-sec.-butyldithiophosphoric acid into the corresponding disulfide which comprises converting one molecular proportion of said acid into its sodium salt, dissolving the salt in water, adding one molecular proportion of sodium nitrite to the solution thus formed, gradually adding one molecular proportion of sulfuric acid to said solution while maintaining the solution at a temperature of about 50–60° C., and separating the product layer from the aqueous layer.

7. The method of converting diethyldithiophosphoric acid into the corresponding disulfide which comprises converting one molecular proportion of the same into its sodium salt, dissolving the salt in water, adding one molecular proportion of sodium nitrite to the solution thus formed, gradually adding one molecular proportion of sulfuric acid to said solution while maintaining the solution at a temperature of about 40–50° C., and separating the product layer from the aqueous layer.

8. The method of converting di-n-propyldithiophosphoric acid into the corresponding disulfide which comprises converting one molecular proportion of the said acid into its sodium salt, dissolving the salt in water, adding one molecular proportion of sodium nitrite to the solution thus formed, gradually adding one molecular proportion of sulfuric acid to said solution while maintaining the solution at a temperature of about 30–40° C., and separating the product layer from the aqueous layer.

HARRY W. RUDEL.
JAMES M. BOYLE.

REFERENCES CITED

The following references are of record in the file of this patent:

UNITED STATES PATENTS

| Number | Name | Date |
| --- | --- | --- |
| 1,763,852 | Johnson | June 17, 1930 |
| 2,060,815 | MacAfee | Nov. 17, 1936 |
| 2,471,115 | Mikeska | May 24, 1949 |

OTHER REFERENCES

Lassar-Cohn, "Arbeitsmethoden fur Organisch-chemische Laboratorien," Spezieller Teil (5th ed., 1923), pages 626 and 751–754.